(No Model.) 2 Sheets—Sheet 1.

W. A. & L. H. BANNISTER.
ROLLER HOLDER FOR PHOTOGRAPHIC FILMS.

No. 316,933. Patented May 5, 1885.

WITNESSES:
H. G. Phillips.
J. R. Williams.

INVENTORS:
Willis A. Bannister
and Louis H. Bannister,
by Geo. B. Selden,
Attorney (No Model.) 2 Sheets—Sheet 2.
W. A. & L. H. BANNISTER.
ROLLER HOLDER FOR PHOTOGRAPHIC FILMS.
No. 316,933. Patented May 5, 1885.
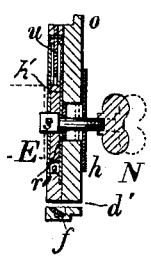
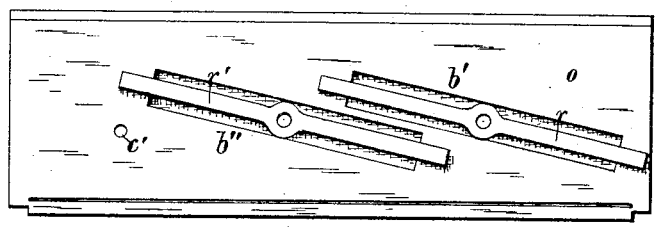
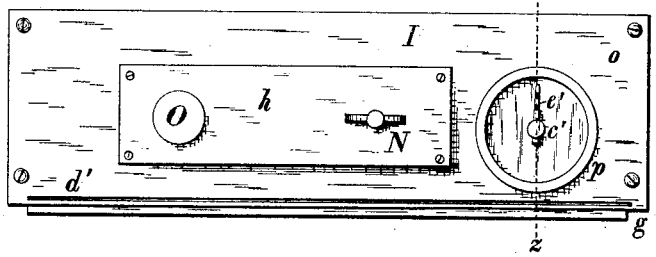
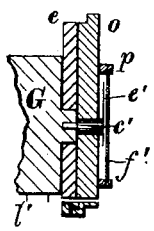
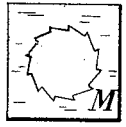
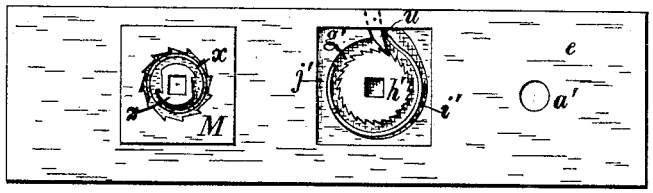
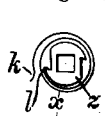
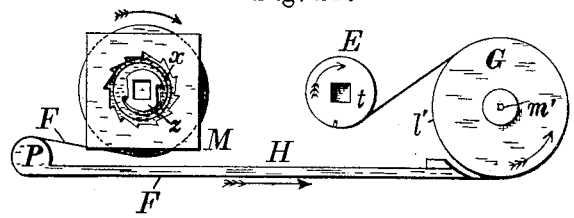
WITNESSES:
H. G. Phillips.
J. R. Williams.
INVENTORS:
Willis A. Bannister
and Louis H. Bannister,
by Geo. B. Selden,
Attorney
N. PETERS, Photo-Lithographer, Washington, D. C.

UNITED STATES PATENT OFFICE.

WILLIS A. BANNISTER AND LOUIS H. BANNISTER, OF ROCHESTER, NEW YORK, ASSIGNORS TO THE EASTMAN DRY PLATE AND FILM COMPANY, OF SAME PLACE.

ROLLER-HOLDER FOR PHOTOGRAPHIC FILMS.

SPECIFICATION forming part of Letters Patent No. 316,933, dated May 5, 1885.

Application filed October 13, 1884. (No model.)

*To all whom it may concern:*

Be it known that we, WILLIS A. BANNISTER and LOUIS H. BANNISTER, residents of Rochester, Monroe county, New York, have jointly invented certain Improvements in Roller-Holders for Photographic Films, of which the following is a specification, reference being had to the accompanying drawings.

Our invention relates to certain improvements in roller-holders for exposing sensitive photographic films, which improvements are fully described in the following specification, and the novel features thereof specified in the claims hereunto annexed.

Figure 1:
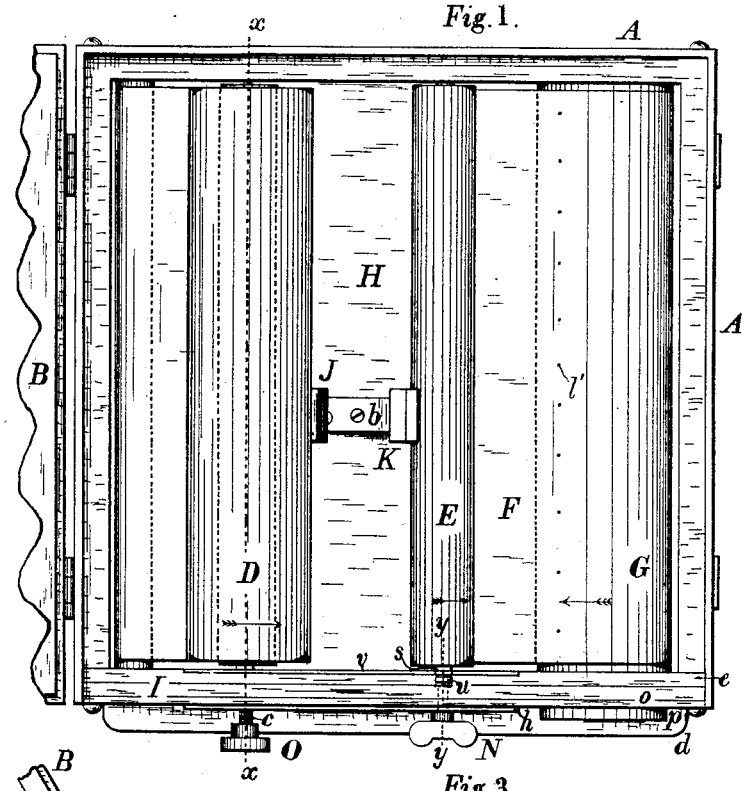
Figure 2:
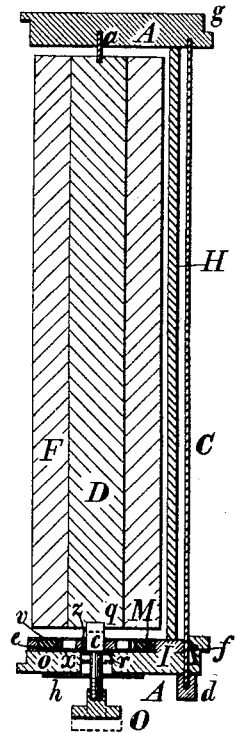
Figure 3:
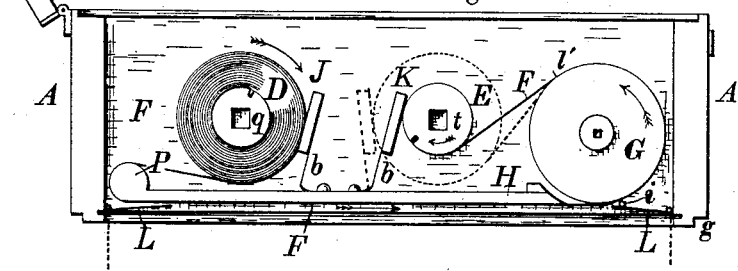
Figure 9:
Figure 4:
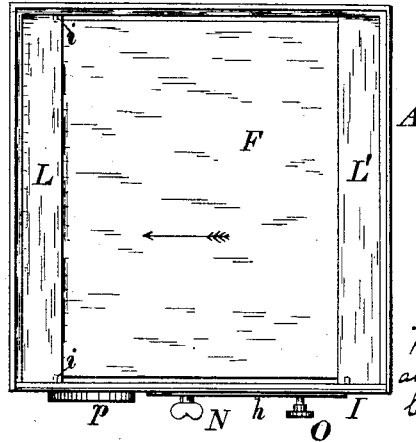

In the accompanying drawings, representing our improvement in roller-holders for photographic films, Figure 1 is a rear elevation of a roller-holder embodying our invention, its rear door or shutter being open so as to display the interior. Fig. 2 is a longitudinal section on the line $x\ x$, Fig. 1. Fig. 3 is a side view of our improved roller-holder, the side or end nearest the observer being removed. Fig. 4 is a front view of our improved roller-holder with the exposing-shutter removed. Fig. 5 represents the inner surface of the outer plate of the removable side or end of our improved roller-holder. Fig. 6 is a side or end view of our improved roller-holder, showing the removable end thereof. Fig. 7 is a view of the exterior of the inner plate of the removable end of our improved roller-holder, showing the film-straining devices. Fig. 8 is a section on the line $y\ y$, Fig. 1. Fig. 9 represents the hinged flap or protector at the sides of the holder detached. Fig. 10 is a section on the line $z\ z$, Fig. 6. Fig. 11 is a diagram representing the action of the straining device. Fig. 12 is a view of the ratchet detached. Fig. 13 represents the collar and spring of the straining device detached. Fig. 14 represents the spring for holding the spindles in engagement with the rollers.

Our improved roller-holder consists, essentially, of a light-tight case or frame, A A, of suitable shape and dimensions, provided on its front side, which is designed to be adapted to any ordinary photographic camera, with the ordinary exposing slide or shutter, C, and on its rear side, or that away from the camera, with a removable or hinged light-tight door or lid, B. Within the holder are placed the revolving rollers D E, on which the flexible photographic film F is wound, the measuring-roller G, and the support or plate H, which sustains the film in position during exposure.

I represents the removable side or end of the holder, which consists of an inner and an outer plate, indicated, respectively, by $e$ and $o$.

The directions in which the rolls and the film travel along the outer surface of the plate H, between each successive exposure, are indicated by the arrows in the drawings, the unexposed film being wound on the roller D, while as fast as exposed the film is wound onto roller E.

J and K represent movable pads or friction-brakes, which are attached to the plate H or the frame by means of springs $b\ b$, which permit the pads to accommodate themselves to the quantity of film on the rollers while maintaining a constant pressure on the back or non-sensitized side of the film.

The rollers D and E are provided at one end with suitable pins or spindles revolving in holes in the frame, as shown at $a$, Fig. 2, while at the other end they are fitted with devices which permit of their being removed from the holder and of being rotated from the outside of the holder. Thus the end of roller E has a hole, $t$, formed therein, which receives the end of the sliding spindle $s$, Figs. 1 and 8, the hole and spindle being formed of such a shape that its rotation will be transmitted to the roller. At its outer end the spindle $s$ is provided with the thumb-nut N, outside the holder, by which it may be revolved. The spindle is arranged to slide lengthwise through the plate $h$, being pressed inward by the spring $r'$, Fig. 5, concealed within a recess, $b''$, in frame of the holder. By pulling the thumb-nut N outward the inner end of the spindle is detached from the roller, which can then be removed from the holder.

Any suitable form of spring may be employed to press the spindle inward into engagement with the roller, but we prefer to use a flat spring of the form represented in Figs. 5 and 14. The spindle $s$ is also arranged to slide through the ratchet $h'$, Fig. 7, by a spring-pawl, $u$, engaging with which the reverse motion of the film-receiving roll E is prevented. The ratchet is located in a recess, $g'$, Fig. 7, in the inner-plate, $e$, of the removable end I, a pawl, $u$, provided with a spring, $i'$, being attached to the plate and arranged to permit the spindle $s$, ratchet $h'$, and roller E to turn in the direction required to wind the film onto the roller, but to prevent its being unwound therefrom. The pawl may be provided with a handle or lever, by which it may be disengaged from the ratchet, so that if it is desired for any purpose to wind the film back onto the roller D, this may be accomplished. The ratchet $h'$ is held in place in the inner plate, $e$, by the plate $v$, Fig. 1, on the inside, and by plates on the outside, which may be let into the plate $e$ in a recess, $j'$, Fig. 7, in order to allow the opposing surfaces of the plates $e$ and $o$ to come close together.

The roller D, on which the film is wound at the time it is introduced into the camera, is provided with a sliding spindle, $c$, Figs. 1 and 2, the inner end of which engages with a suitably-shaped recess, $q$, Fig. 3, in the end of the roller, so that the rotation of the spindle is communicated to the roller. The outer end of the spindle $c$ is provided with means for turning it, which preferably consist of a milled head, O, to distinguish it from the thumb-nut N. The spindle $c$ is constantly pressed inward by the spring $r$ in the recess $b'$, Fig. 5, in the outer plate, $o$.

The film-straining device, which is shown in Figs. 2, 7, 11, 12, and 13, is located in a recess in the plate $e$, being secured in place therein by suitable plates on each side thereof.

The straining device consists of a ratchet, M, having internal teeth, and a spring, $x$, the outer end of which engages with the teeth of the ratchet M, while the inner end is bent over on itself and engaged in a notch, $l$, or otherwise secured to the collar $z$, through which the spindle $c$ slides and which revolves therewith. The operation of the straining device is as follows: The roller D being full of film, the outer or free end of which is carried along the plate H, about the measuring-roll G, and attached to the roll E, on turning the latter in the direction represented by the arrows the film will be wound on the latter under the tension caused by the strain on the spring $x$, which will be wound up or compressed until sufficient force is applied to cause its free end $k^1$, Fig. 13, to slip along over the teeth of the ratchet M. When the spring $x$ has been once compressed, it will maintain a yielding strain or tension on the film until it has all been exposed, the spring yielding slightly, if necessary, to permit any change in the length of the film due to absorption or loss of moisture. The amount of tension applied to the film by the spring will depend on the strength of the spring and on the height and inclination of the teeth in the ratchet M. By connecting the inner end of the spring to the collar $z$, by a hook on the end of the spring $x$ engaging in one or more notches in the edge of the collar, provision is made for turning the roller D in the reverse direction, so that the film may, if desired, be rewound on that roller. The bent inner end of the spring $x$ will in this case slide on the edge of the collar.

The operation of the straining device will be understood from an inspection of the diagram, Fig. 11, from which it will be perceived that rotary motion imparted to the roller E will be transmitted to the roller D by the film, and that the spring $x$ will be compressed or strained by the motion of the latter roller, until its outer end is compelled to slip around the interior of the ratchet M, passing over the teeth thereof. The brakes J and K serve to steady and render uniform the motion of the rollers. Along the opposite sides of the holder are arranged the flaps L L', Figs. 4 and 9, which operate to protect the sensitive film behind them from the operation of the light during exposure. The flaps L L' may be secured to the walls of the holder in any suitable manner, or, as shown in the drawings, they may be provided with pivots $jj$, projecting from their outer corners into holes formed in the side walls of the holder-frame. In this case the frame should have pins or stops $i\ i$, Fig. 4, inserted in it in such position as to hold the inner edge of the flap as close as possible to the film without contact therewith. The exposing-shutter C is arranged to slide in suitable grooves in the side walls of the frame of the holder, being provided with the handpiece $d$ and the usual spring-flap, $f$, for excluding the light when the shutter is removed.

The measuring-roll G, which is supported by suitable journals at each end revolving in the side walls of the holder, is made of a diameter such that its circumference is just equal to the length of film necessary for one exposure in the size of holder in which it is employed. The measuring-roll is provided with a longitudinal row of pins or points, $l'$, which project outward from it a sufficient distance to perforate the film as it passes about the roller. The places at which the film should be divided in order to separate the different exposures from each other are therefore indicated by the punctures made by the points $l'$. An indicator, $e'$, outside the frame of the holder, is also connected with the measuring-roll, so as to revolve therewith and show the relative positions of the exposed and unexposed portions of the film. The pointer or indicator $e'$ is attached to a revolving spindle, $c'$, passing through the outer plate, $o$, of the removable end of the holder and having its inner end fitted to an opening, $m'$, in the journal of the measuring-roll, so that it is compelled to rotate therewith. The pointer revolves in a suitable casing, $p$, attached to the exterior of the holder and provided with a glass plate, $f'$, through which the position of the pointer may be observed. The removable end of the holder is provided with a slot, $d'$, for the exposing-shutter, and it may be fastened to the frame of the holder in any preferred manner, so as to be capable of being detached therefrom. The rollers D and E may, however, be taken out of or replaced in the holder without removing the end I, the sliding spindles $c$ and $s$ permitting of these operations. The slot $d'$ is provided with the usual spring-flap, $f$, for preventing the entrance of light when the exposing-shutter is removed. The ends of the film may be attached to the rollers in any convenient way—as, for instance, by glue or paste, or by any suitable clips, or by inserting the film in a slot cut lengthwise of the roller and securing it therein by a long wedge-shaped strip forced tightly into the slot.

In the drawings we have represented the outer end of the film-straining spring $x$ as revolving within a block, M, attached to the frame and having a circular opening in it provided with ratchet-teeth or serrations, and this is the form which we prefer; but it is obvious that if the spring be made sufficiently strong the teeth or serrations may be dispensed with and the outer end of the spring allowed to bear on a smooth circular opening in a suitable ring or plate fastened to the holder, or a friction piece may be attached to the end of the spring.

The manner of using our improved roller-holder will have been already understood from the preceding description by any person acquainted with the art of photography. The film having been introduced into the holder on the roller D is carried along the support H, (which is attached to the frame of the holder and provided at one end with the rounded bar P,) around the measuring-roll G, and attached to the roller E. On turning the thumb-nut N, the film will be drawn along the support under a tension caused by the spring $x$ being unwound from the roller D and wound up on the roller E. As the film is moved along between each exposure, the pointer or indicator $e'$, revolving with the measuring-roll G, shows when the exposed film has been drawn along from in front of the support and an unexposed section of the film brought into place for exposure, a mark or graduations being placed on the side of the holder over which the pointer travels. The pins or points $l'$ on the measuring-roll perforate the film on the lines between the different exposures, showing where the film is to be divided.

We claim—

1. The combination, in a roller-holder, of the measuring-roll G and detachable spindle $c'$, passing through the wall of the holder and carrying the indicator $e'$, substantially as described.

2. The combination, in a roller-holder, of the measuring-roll G, detachable spindle $c'$, indicator $e'$, casing $p$, and transparent-plate $f'$, substantially as described.

3. In a roller-holder for exposing photographic films, and in combination with the inclosing-case and rollers, the removable end or side supporting the corresponding ends of the rollers, substantially as described.

4. The combination, in a roller-holder, of the measuring-roll G, removable end I, spindle $c'$, and indicator $e'$, substantially as described.

5. The combination, in a roller-holder, with one of the film-carrying rolls, of a friction pad or brake arranged to act on the reverse or unsensitized side of the film, substantially as described.

6. The combination, in a roller-holder, of the film-carrying rolls D and E, friction pieces J and K, and springs $b$, substantially as described.

7. The combination, in a roller-holder, with the film-carrying rolls, of a measuring-roll provided with a series of film-perforating devices arranged longitudinally of the roll, and the latter having its circumference equal to the length of the film required for a single exposure, substantially as described.

8. The combination, in a roller-holder, of the film-receiving roller E, provided with mechanism which prevents its reverse motion, and the film-carrying roller D, having connected therewith the spring $x$, arranged to operate as a film-straining device, substantially as described.

9. The combination, in a roller-holder, of the removable film-carrying roller D, sliding spindle $c$, and spring $r$, substantially as described.

10. The combination, with the film-receiving roller E, provided with ratchet $h'$ and spring-pawl $u$, of the film-carrying roller D, provided with spring $x$, the outer end of which revolves against a friction-resistance, substantially as described.

11. In combination with the inclosing-case and the measuring-roller contained therein, the removable end piece carrying the indicator, the latter when the said end piece is applied to the case being brought into operative connection with said measuring-roller, substantially as described.

12. The combination, with the roller D, of the spring $x$, collar $z$, and ratchet M, the inner end of said spring engaging notches in the collar $z$, and the outer end resting in frictional contact with the teeth of ratchet M, substantially as described.

13. The combination, with the roller D, of the spindle $c$, collar $z$, spring $x$, and a frictional piece, M, attached to the holder, substantially as described.

14. The combination, with the roller D, of the sliding spindle $c$, and the collar $z$ and spring $x$, arranged within a suitable recess in the wall of the holder, substantially as described.

15. The combination, with the roller E, of the sliding spindle $s$ and ratchet $h'$, provided with a spring-pawl and arranged within a recess in the wall of the holder, substantially as described.

16. In a roller-holder for exposing photographic films, the combination, with the winding and unwinding rollers located in the inclosing-case and provided at one end with the fixed bearings therein, of the removable side or end piece, and the devices mounted thereon for engaging the ends of the said rollers and affording bearings for the latter, substantially as described.

17. In combination with the supporting-frame of a roller-holder, a rotary tension device independently mounted or supported upon said frame, and a spool upon which the film is wound detachably applied to said tension device, substantially as described.

18. In a roller-holder for photographic films, the combination with the frame, of the spindle supported therein and provided with means for engaging the end of the spool, and a yielding tension device applied intermediate the said spindle and the frame, substantially as described, whereby the spool can be removed or applied to the tension device and spindle at will.

19. In a roller-holder such as described, wherein the film-supply is wound upon a spool and drawn therefrom at intervals to expose a limited surface and in combination with said spool, a longitudinally-adjustable spindle provided with means for engaging the end of the removable spool, and a yielding tension device applied to said spindle, substantially as described.

WILLIS A. BANNISTER.
     LOUIS H. BANNISTER.

Witnesses:
 GEO. B. SELDEN,
 GEO. H. HARRIS.